(12) United States Patent
Kitagawa

(10) Patent No.: US 10,356,267 B2
(45) Date of Patent: Jul. 16, 2019

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Kan Kitagawa, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/816,828

(22) Filed: Nov. 17, 2017

(65) Prior Publication Data
US 2018/0146110 A1    May 24, 2018

(30) Foreign Application Priority Data
Nov. 22, 2016   (JP) .................................. 2016-226553

(51) Int. Cl.
| | |
|---|---|
| *G06F 3/12* | (2006.01) |
| *H04N 1/00* | (2006.01) |
| *G06F 9/44* | (2018.01) |
| *G06F 8/61* | (2018.01) |
| *G06K 15/02* | (2006.01) |
| *G06F 9/4401* | (2018.01) |

(52) U.S. Cl.
CPC ....... *H04N 1/00973* (2013.01); *G06F 3/1204* (2013.01); *G06F 3/1225* (2013.01); *G06F 3/1232* (2013.01); *G06F 8/61* (2013.01); *G06F 9/4411* (2013.01); *H04N 1/00042* (2013.01); *H04N 1/00323* (2013.01); *G06F 3/122* (2013.01); *H04N 2201/0082* (2013.01)

(58) Field of Classification Search
None
See application file for complete search history.

(56) References Cited

U.S. PATENT DOCUMENTS

| | | | | |
|---|---|---|---|---|
| 8,332,837 B2 * | 12/2012 | Nakata | .................. | G06F 9/4411 717/173 |
| 2004/0130741 A1 * | 7/2004 | Ferlitsch | ................ | G06K 15/02 358/1.13 |
| 2007/0240156 A1 * | 10/2007 | Nakata | .................. | G06F 9/4411 717/178 |
| 2008/0120614 A1 * | 5/2008 | Yamada | .................... | G06F 8/61 717/175 |
| 2008/0244567 A1 * | 10/2008 | Zhan | ..................... | G06F 9/4415 717/178 |

(Continued)

FOREIGN PATENT DOCUMENTS

JP     2010-205009 A     9/2010

Primary Examiner — Beniyam Menberu
(74) Attorney, Agent, or Firm — Canon U.S.A., Inc. IP Division

(57) ABSTRACT

An information processing apparatus capable of running monitoring software configured to execute monitoring processing for monitoring a printer driver executes at least either one of first processing and second processing by using the monitoring software, the first processing including, if installation processing of the printer driver occurs, obtaining information about an image processing apparatus corresponding to the installed printer driver from the image processing apparatus, the second processing including, if uninstallation processing of the printer driver occurs, deleting a file related to the uninstalled printer driver.

18 Claims, 10 Drawing Sheets

(56) References Cited

U.S. PATENT DOCUMENTS

| | | | |
|---|---|---|---|
| 2009/0100422 A1* | 4/2009 | Abe | G06F 9/4411 717/174 |
| 2009/0175200 A1* | 7/2009 | Abe | H04L 12/2809 370/254 |
| 2010/0002253 A1* | 1/2010 | Kim | G06F 3/1204 358/1.15 |
| 2010/0220355 A1* | 9/2010 | Sugiyama | G06F 3/1203 358/1.15 |
| 2010/0225946 A1* | 9/2010 | Fukasawa | G06F 3/1204 358/1.13 |
| 2011/0038005 A1* | 2/2011 | Ochiai | G03G 15/5075 358/1.15 |
| 2011/0261396 A1* | 10/2011 | Takahashi | G06F 3/1204 358/1.15 |
| 2012/0017208 A1* | 1/2012 | Lussier | G06F 8/65 717/174 |
| 2013/0258357 A1* | 10/2013 | Tsujii | G06F 3/1292 358/1.6 |
| 2015/0169267 A1* | 6/2015 | Hirakawa | G06F 3/1225 358/1.13 |
| 2016/0253132 A1* | 9/2016 | Nishida | H04N 1/00973 358/1.15 |

* cited by examiner

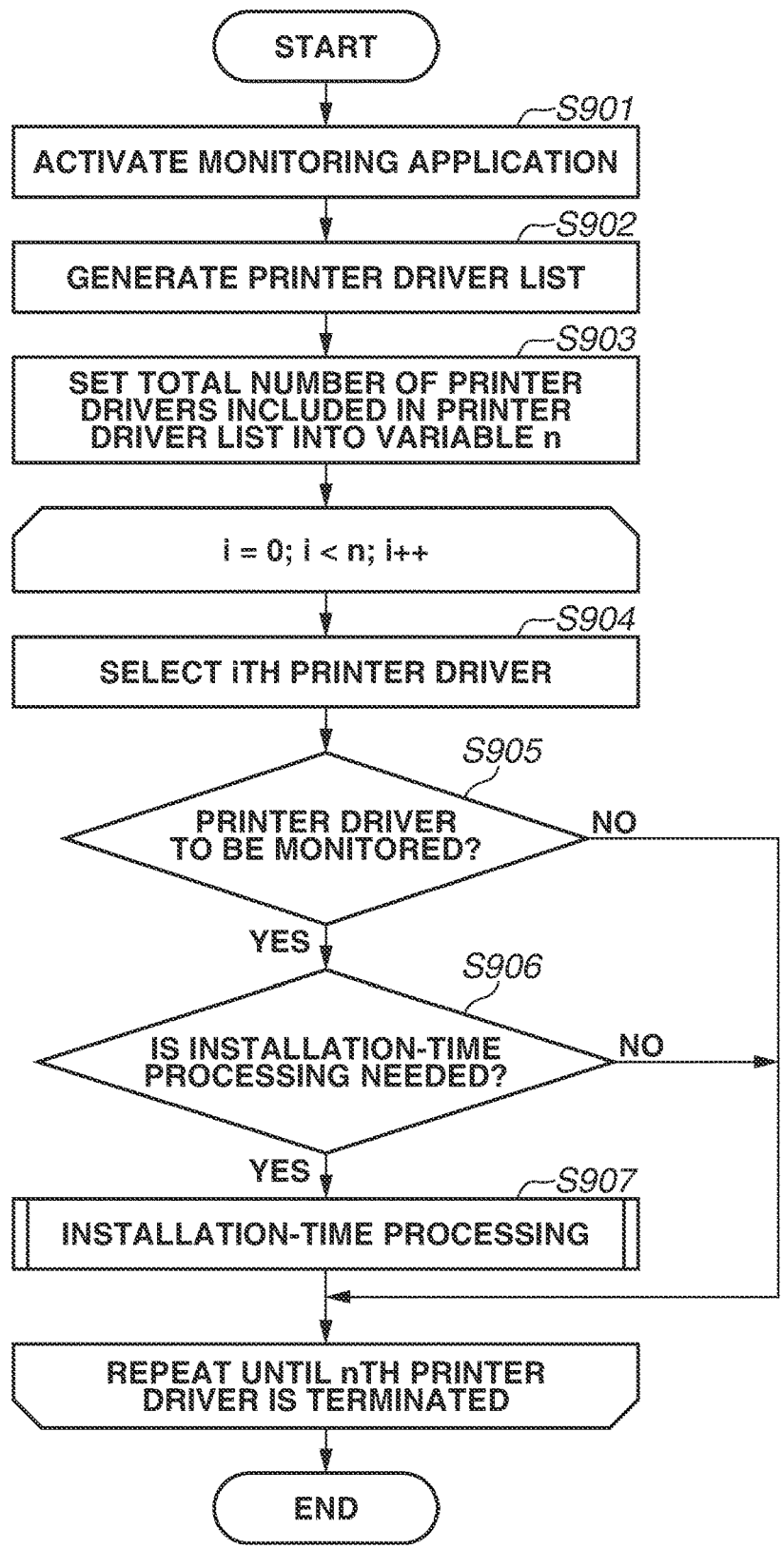

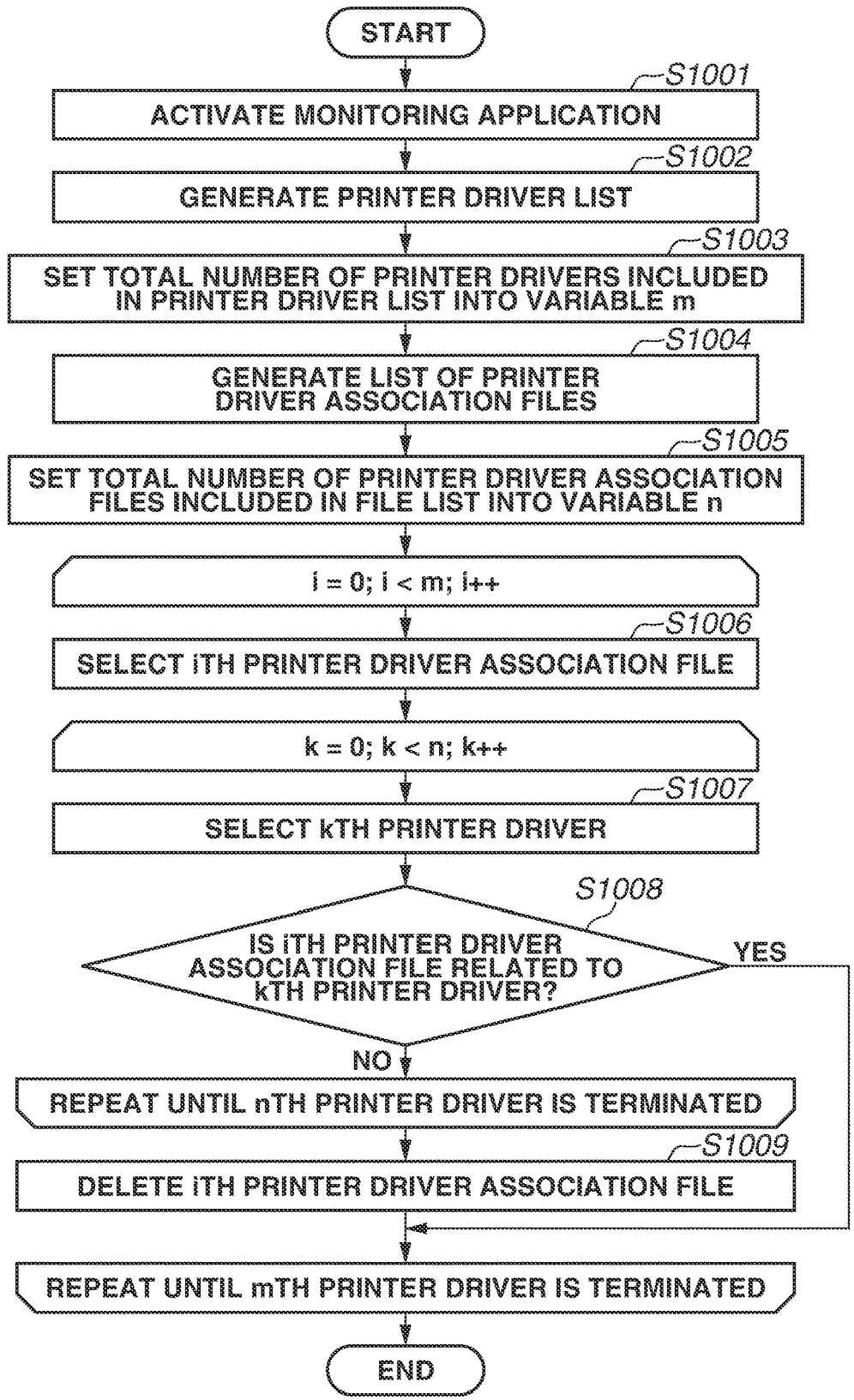

INFORMATION PROCESSING APPARATUS, CONTROL METHOD, AND STORAGE MEDIUM

BACKGROUND OF THE INVENTION

Field of the Invention

The present invention relates to an information processing apparatus connecting to an image processing apparatus, a control method thereof, and a storage medium.

Description of the Related Art

In an information processing system in which an information processing apparatus such as a personal computer and an image processing apparatus such as a printer are connected, the information processing apparatus typically includes a printer driver for transmitting print data to the image processing apparatus.

Windows (registered trademark), an operating system (OS) from Microsoft Corporation, provides a v3 printer driver architecture. The v3 printer driver architecture includes a mechanism by which the OS calls a module of a printer driver when the printer driver is installed on or uninstalled from the OS. For example, if a printer driver is installed on the OS, the OS sets PRINTER_EVENT_INITIALIZE to a command argument of the DrvPrinterEvent function. An installation event of the printer driver is then transmitted to the printer driver.

Japanese Patent Application Laid-Open No. 2010-205009 discusses execution of processing corresponding to installation or processing corresponding to uninstallation by the module of the printer driver which is called from the OS by using such a mechanism of the OS.

Japanese Patent Application Laid-Open No. 2010-205009 does not take into consideration situations in which the module of the printer driver is not called at timing when predetermined processing including the installation or uninstallation of the printer driver occurs. In such situations, the technique discussed in Japanese Patent Application Laid-Open No. 2010-205009 may fail to perform processing to be executed when predetermined processing including the installation or uninstallation of the printer driver occurs, with a drop in user convenience.

SUMMARY OF THE INVENTION

According to embodiments of the present invention, an information processing apparatus capable of running monitoring software configured to perform monitoring processing for monitoring a printer driver includes an execution unit configured to execute at least either one of first processing and second processing by using the monitoring software, the first processing including, if installation processing of the printer driver occurs, obtaining information about an image processing apparatus corresponding to the installed printer driver from the image processing apparatus, the second processing including, if uninstallation processing of the printer driver occurs, deleting a file related to the uninstalled printer driver, wherein the monitoring software is activated according to activation of the information processing apparatus.

Further features of the present invention will become apparent from the following description of exemplary embodiments with reference to the attached drawings.

BRIEF DESCRIPTION OF THE DRAWINGS

FIG. 9 is a flowchart illustrating processing for checking the presence or absence of a printer driver.

FIG. 10 is a flowchart illustrating processing for checking the presence or absence of an uninstalled printer driver.

DESCRIPTION OF THE EMBODIMENTS

Figure 1:
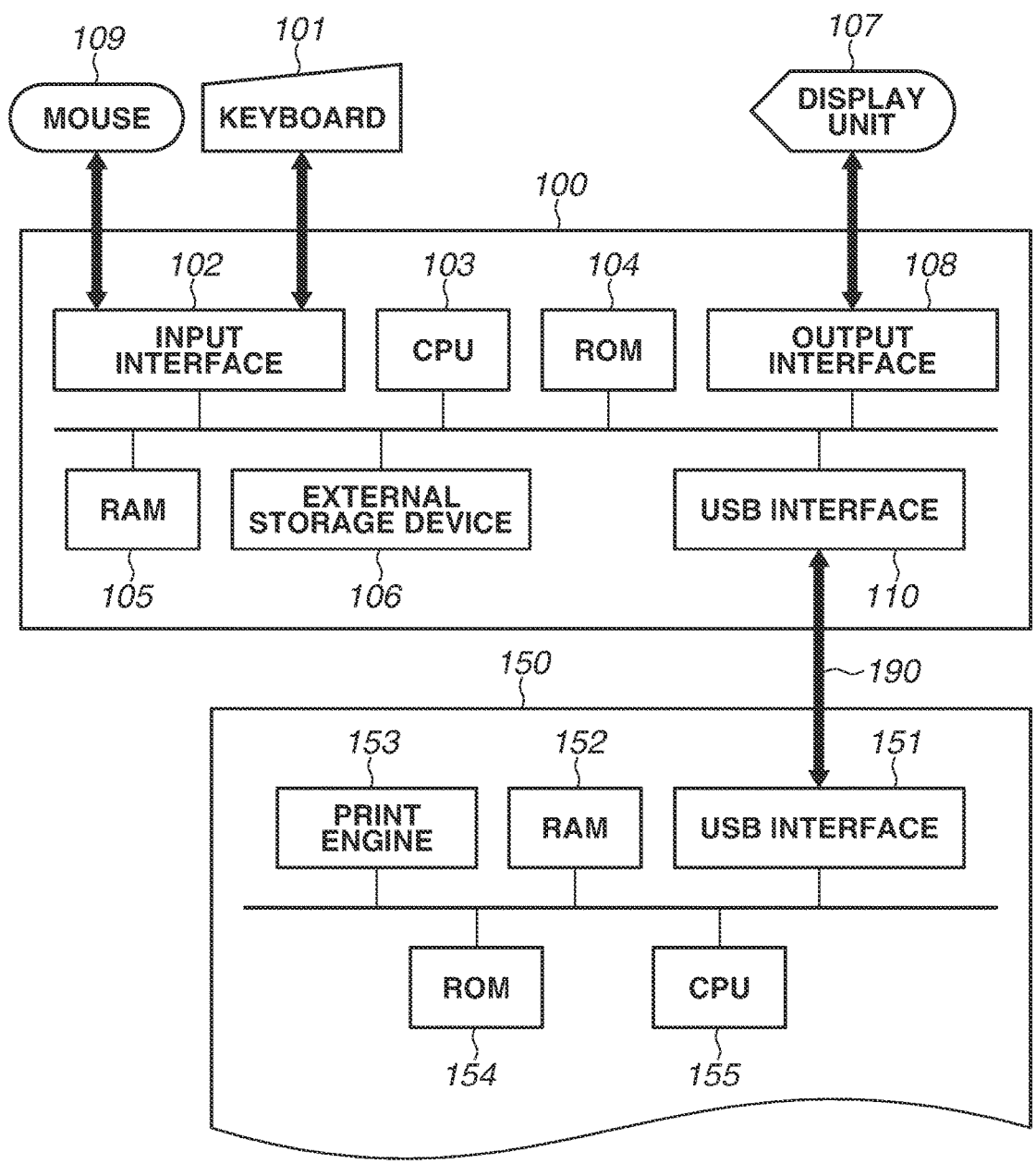
FIG. 1 is a hardware configuration diagram of an information processing apparatus and an image processing apparatus.

A configuration of an image processing apparatus and an information processing apparatus according to a first exemplary embodiment will be described with reference to FIG. 1. An information processing apparatus 100 includes an input interface 102, a central processing unit (CPU) 103, a read-only memory (ROM) 104, a random access memory (RAM) 105, an external storage device 106, an output interface 108, a display unit 107, a keyboard 101, a mouse 109, and a Universal Serial Bus (USB) interface 110. The information processing apparatus 100 can communicate with an image processing apparatus 150 to be described below via the USB interface 110 and a USB cable 190. The ROM 104 stores an initialization program. The external storage device 106 stores a group of application programs, an OS, a printer driver, and various types of other data. Various programs stored in the external storage device 106 use the RAM 105 as a work memory.

The image processing apparatus 150 includes a USB interface 151, a RAM 152, a print engine 153, a ROM 154, and a CPU 155. The image processing apparatus 150 can communicate with the information processing apparatus 100 via the USB interface 151 and the USB cable 190. The RAM 152 is used as a main memory and a work memory of the CPU 155. The RAM 152 functions as a reception buffer for temporarily storing received print data, and stores various types of data. The print engine 153 performs printing based on the print data stored in the RAM 152. While the information processing apparatus 100 and the image processing apparatus 150 are described to have the foregoing mode of processing distribution as an example, the mode of distribution is not particularly limited thereto and other modes may be employed. While the information processing apparatus 100 and the image processing apparatus 150 are described to communicate via the USB interfaces 110 and 151 and the USB cable 190 as an example, other modes of communication units may be used. In the present exemplary embodiment, the CPU 103, the ROM 104, and the RAM 105 constitute a computer. The computer controls an operation of the information processing apparatus 100.

Figure 2:
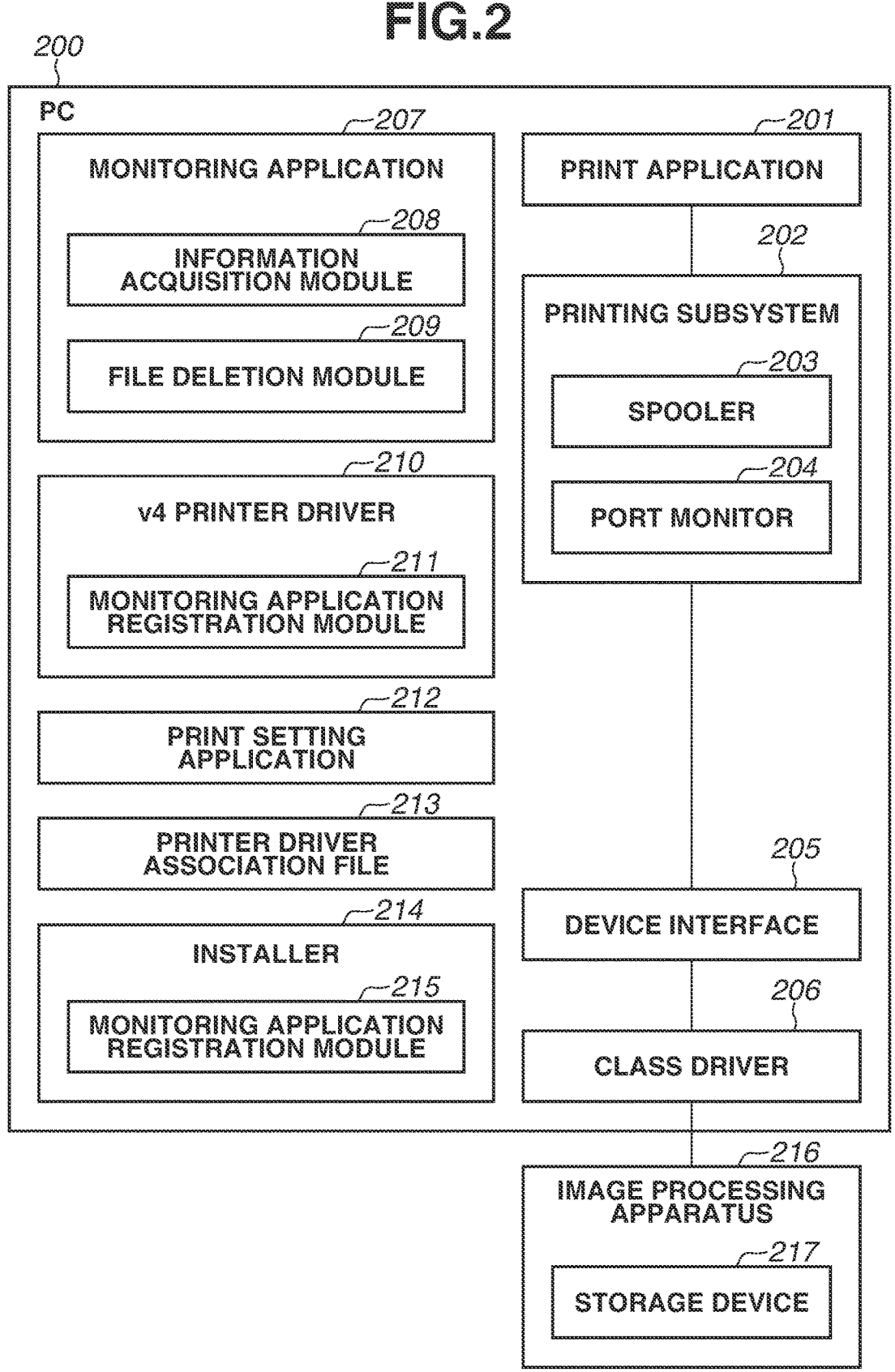
FIG. 2 is a diagram illustrating an example of a software configuration of the information processing apparatus.

FIG. 2 is a diagram illustrating a configuration example of a printer driver 210 and a monitoring application 207 which are included in a personal computer (PC) 200, and a printing subsystem 202 of an OS. The PC 200 corresponds to the information processing apparatus 100 of FIG. 1. An image processing apparatus 216 corresponds to the image processing apparatus 150 of FIG. 1.

FIG. 2 illustrates an example of a relationship between a new printing system implemented on a new OS and the monitoring application 207. A description will be given by using a next-generation Windows printer driver (v4 printer driver) architecture as an example of the new printing system. The v4 printer driver architecture does not include a mechanism by which the OS calls a module of a printer driver at timing when the printer driver is installed or uninstalled. This new printing system has several restrictions. For example, the v4 printer driver 210 is not allowed to have a print setting screen. No print setting screen of the v4 printer driver 210 is therefore called by the OS. A print setting screen is then provided by the OS. However, vendors can provide a print setting application 212 corresponding to the v4 printer driver 210. If the print setting application 212 is installed on the OS, a print setting screen provided by the print setting application 212 is displayed instead of the print setting screen provided by the OS. Installation processing of the print setting application 212 may be performed in a linked manner with that of the v4 printer driver 210. Specifically, if downloading software downloads the v4 printer driver 210 from a predetermined server and installs the v4 printer driver 210, the downloading software searches the predetermined server for the print setting application 212 corresponding to the installed v4 printer driver 210. If the corresponding print setting application 212 is searched for, the downloading software may download the print setting application 212 from the predetermined server and install the print setting application 212. Since the print setting application 212 and the v4 printer driver 210 are associated with each other by identification information, the identification information can be used to implement the linked installation processing. Unlike vendor-specific user interface modules of v3 printer drivers, the print setting application 212 is not called by the OS at the timing of installation or uninstallation of the printer driver 210. The print setting screen of the print setting application 212 is capable of more detailed selections of print setting information than the print setting screen provided by the OS is. For example, the print setting screen of the print setting application 212 accepts settings of print setting information about setting items that are unable to be set from the print setting screen provided by the OS.

Another restriction is that the new printing system implemented on the new OS is not allowed to run a language monitor program. Specifically, the new OS running on the PC 200 of FIG. 2 is restricted not to include a language monitor program for transmitting and receiving data to/from the image processing apparatus 216 as a file constituting the v4 printer driver 210. That is, the OS does not call the print setting screen of the v4 printer driver 210 and calls the print setting screen of the print setting application 212 related to the v4 printer driver 210. The OS does not call a language monitor, either. The v4 printer driver 210 (hereinafter, referred to simply as "printer driver") generates print data according to a print instruction issued by a print application 201, and transmits the print data to the image processing apparatus 216. The printer driver 210 obtains capability information and status information from the image processing apparatus 216.

The monitoring application 207 performs monitoring processing for monitoring whether at least one of an addition, deletion, and change of the printer driver 210 to/from the OS is executed. Examples of the change of the printer driver 210 include a change of a printer icon name and a change of a port for performing communication with the image processing apparatus 216.

If the addition of the printer driver 210 is detected, the monitoring application 207 obtains information from the image processing apparatus 216 by using an information acquisition module 208. The information obtained here is used to construct a setting screen of the print setting application 212, for example. If the deletion of the printer driver 210 is detected, the monitoring application 207 deletes a printer driver association file 213 by using a file deletion module 209.

The printer driver association file 213 is a file related to the printer driver 210. Information about various settings of the printer driver 210 is recorded in the printer driver association file 213. The printer driver association file 213 is generated in a storage area which the OS refers to in the information processing apparatus 100. The printer driver association file 213 is not deleted by uninstallation of the printer driver 210. If Windows (registered trademark) is used as the OS, the printer driver association file 213 may be generated in a location such as the "ProgramData" folder and the "Application Data (AppData)" folder. Which printer driver the printer driver association file 213 relates to can be identified by providing a naming rule about the filename of the printer driver association file 213 and the folder name of the folder containing the printer driver association file 213.

An installer 214 is software for installing the monitoring application 207 when activated by a user's instruction. If the monitoring application 207 is installed by the installer 214, the monitoring application 207 is registered in the startup folder and activated by a monitoring application registration program 215 of the installer 214. The monitoring application 207 registered in the startup folder runs as a resident application. That is, the monitoring application 207 basically starts processing immediately after the activation of the OS, and ends processing when the OS is terminated. Running the monitoring application 207 as a resident application can continue monitoring processing at least if there is a printer driver 210 to be monitored. In other words, if the information processing apparatus 100 is activated, the monitoring application 207 performs monitoring processing.

The monitoring application 207 may be included in the components of the printer driver 210 so that a monitoring application registration module 211 of the printer driver 210 registers the monitoring application 207 in the startup folder. In such a case, the monitoring application 207 is registered in the startup folder at timing when the printer driver 210 runs (for example, when printing is executed). If the monitoring application 207 is registered in the startup folder, the monitoring application 207 can be activated by the OS and start operation even after a restart of the OS or after re-login to the OS.

Next, a data flow when print data is delivered from the PC 200 to the image processing apparatus 216 will be described with reference to FIG. 2. The print application 201 requests print processing by using an application program interface (API) for issuing a print instruction, provided by the OS. A print job issued based on the request for print processing is processed by a spooler 203 of the printing subsystem 202 in the OS. The spooler 203 transmits the print job issued from the print application 201 to the printer driver 210. Receiving the print job, the printer driver 210 performs page configuration processing and command generation processing to generate print data interpretable by the image processing apparatus 216.

As employed herein, the page configuration processing refers to processing for rearranging page order based on print setting information specified by the print application 201, and processing for laying out a plurality of pages into a physical page corresponding to one side of a sheet. The command generation processing refers to processing for covering the print job into the print data interpretable by the image processing apparatus 216. If the processing for covering the print job into the print data is completed, the printer driver 210 passes the print data to a port monitor 204 in the printing subsystem 202. The port monitor 204 then transfers the print data to the image processing apparatus 216 via a device interface 205 and a class driver 206.

Next, a method by which the monitoring application 207 monitors the addition, deletion, and change of the printer driver 210 will be described with reference to FIG. 2. The monitoring application 207 monitors one or more printer drivers 210, and monitors the installation, uninstallation, or change of the printer driver(s) 210 by using APIs provided by the OS.

If the monitoring application 207 detects the installation of a printer driver 210, the monitoring application 207 communicates with the image processing apparatus 216 via the port monitor 204. The monitoring application 207 then obtains the capability information about the image processing apparatus 216, stored in a storage device 217 in the image processing apparatus 216, and information about sheets printable by the image processing apparatus 216. The obtained information is shared with the printer driver 210 or the print setting application 212. To share the information, the monitoring application 207 may output the information to the printer driver association file 213. The monitoring application 207 may call a function published by the printer driver 210 or the print setting application 212, and pass the information as an argument thereof. Other methods may be used. The shared information is used to determine the processing of the printer driver 210 when printing is executed. For example, the printer driver 210 determines based on the shared information whether the image processing apparatus 216 can receive a username and a hostname. Based on the determination, the printer driver 210 determines whether to set a username and a hostname for the print data. The print setting application 212 determines the contents of the print setting screen to be displayed based on the shared information.

If the uninstallation of a printer driver 210 is detected, the monitoring application 207 deletes the printer driver association file 213 which is not included in the components of the printer driver 210 or deleted by the uninstallation. What is to be deleted may be information registered in the Registry. Specifically, the printer driver association file 213 to be deleted is stored in a folder having the printer driver name of the uninstalled printer driver 210. The monitoring application 207 then identifies the printer driver name of the uninstalled printer driver 210 to identify the folder to be deleted, and deletes the folder. As a result, the printer driver association file 213 of the uninstalled printer driver 210 is deleted.

If the change of a printer driver 210 is detected, the monitoring application 207 changes the generation location of the printer driver association file 213 or changes the contents described in the printer driver association file 213.

Figure 3:
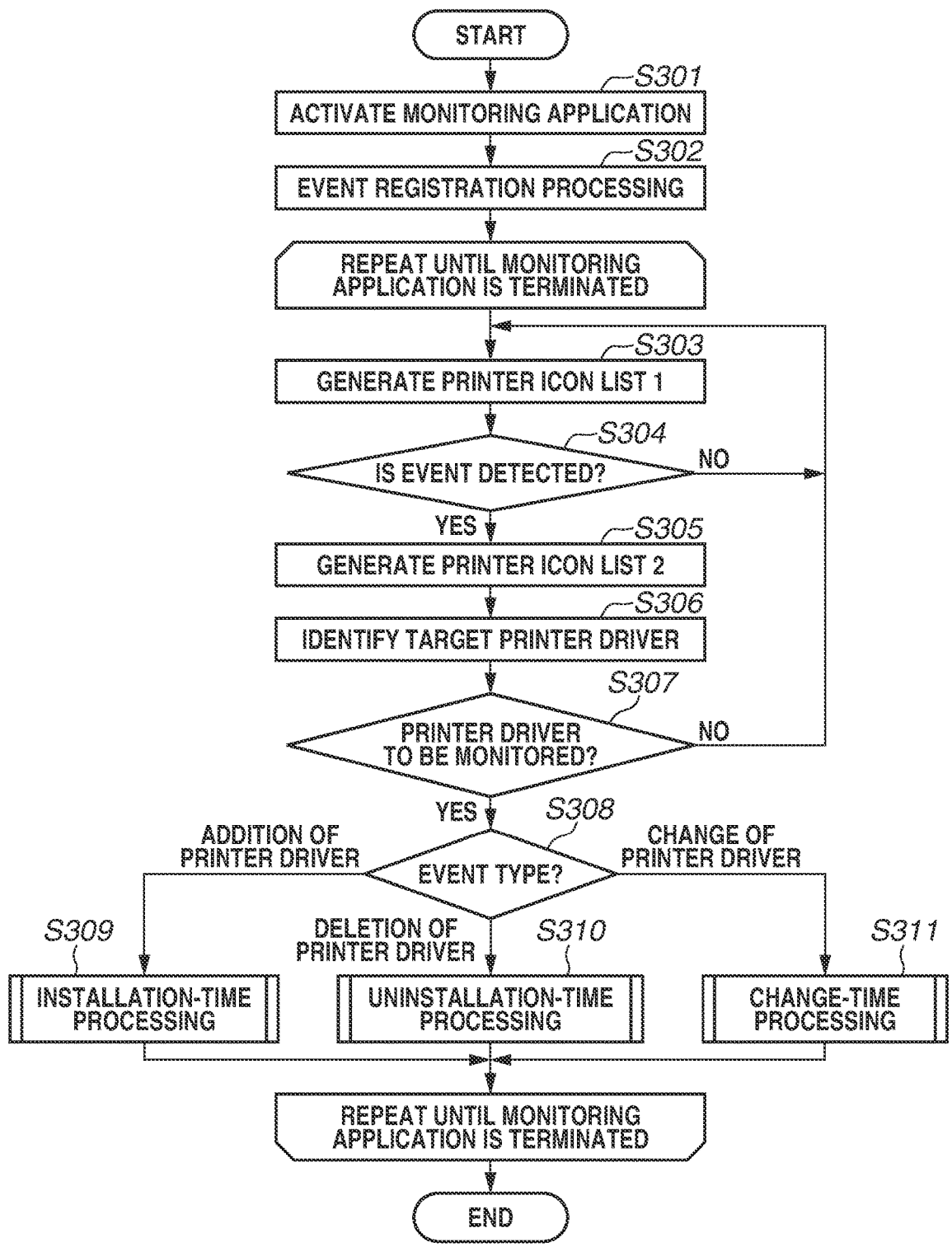
FIG. 3 is a flowchart illustrating processing using an event notification function of an operating system (OS).

FIG. 3 is a flowchart illustrating a flow of processing of the monitoring application 207. In the present exemplary embodiment, the CPU 103 reads and executes a program needed for the processing of the flowchart, whereby the processing of the flowchart is performed. In step S301, the monitoring application 207 is activated by an instruction from the OS, the installer 214, or the printer driver 210. After step S301, the monitoring application 207 starts monitoring processing. In step S302, the monitoring application 207 performs event registration processing for registering events for detecting the addition, deletion, and change of a printer driver 210 into the OS by using the APIs provided by the OS. For example, in the case of Windows, the monitoring application 207 can monitor the addition, deletion, and change of a printer driver 210 to/from the OS by using the FindFirstPrinterChangeNotification API and the FindNextPrinterChangeNotification API. Such event registration enables the OS to notify the monitoring application 207 of the occurrence of the addition, deletion, and change of a printer driver 210, as events.

The monitoring application 207 then obtains information (PRINTER_INFO structure) about printers installed on the OS by using the EnumPrinters API provided by the OS. In step S303, the monitoring application 207 generates a printer driver list 1 enumerating printer driver names and printer icon names based on the information. The processing of step S302 and that of step S303 may be performed in reverse order. In step S304, the monitoring application 207 detects whether an event is issued from the OS.

As a result of the event registration processing in step S302, if a new printer driver 210 is added, the OS notifies the monitoring application 207 of an event corresponding to the addition of the printer driver 210. If a printer driver 210 is uninstalled, the OS notifies the monitoring application 207 of an event corresponding to the uninstallation of the printer driver 210. Similarly, if a printer driver 210 is changed, the OS notifies the monitoring application 207 of an event corresponding to the change of the printer driver 210. In step S304, if the monitoring application 207 detects any of the events (YES in step S304), the processing proceeds to step S305. In step S305, like step S303, the monitoring application 207 generates a printer driver list 2 enumerating pieces of information about the printer driver(s) 210 installed on the OS at that point in time. The purpose for the generation of the two printer driver lists 1 and 2 will be described. By receiving an event, the monitoring application 207 can identify whether a printer driver 210 is added, deleted, or changed. However, the monitoring application 207 is not able to determine, from the event, alone which printer driver 210 the target of the processing is. The monitoring application 207 then identifies the printer driver 210 added, deleted, or changed before and after the event detection by using the printer driver lists 1 and 2 generated in steps S303 and S305.

The monitoring application 207 can identify the added or deleted printer driver 210 by checking the presence or absence of the printer driver 210 in the two printer driver lists 1 and 2. If the printer driver lists 1 and 2 include printer icon names and/or port names linked with the printer driver names, the monitoring application 207 can identify the printer driver 210 of which the printer icon name or port name is changed from the comparison result of the two printer driver lists 1 and 2.

In step S306, the monitoring application 207 compares the printer driver list 1 generated in step S303 with the printer driver list 2 generated in step S305, and identifies from the difference the target printer driver 210 of the event detected in step S304. In step S307, the monitoring application 207 determines whether the printer driver 210 identified in step S306 is a printer driver 210 to be monitored.

The determination may be made by a method using a character string included in the printer driver name. Other methods include one using architecture version information about the printer driver 210, which is obtained by using the GetPrinterDriver API, and one using the installation folder of the printer driver 210, which differs between a v3 printer driver and a v4 printer driver. Such pieces of information may be combined for determination. For example, the monitoring application 207 may determine a printer driver 210 satisfying both conditions of being a printer driver from a predetermined manufacturer and being a v4 printer driver, to be a printer driver 210 to be monitored. The monitoring application 207 may determine a printer driver 210 satisfying at least either one of the two conditions to be a printer driver 210 to be monitored. In step S307, if the printer driver 210 identified in step S306 is determined not to be a printer driver 210 to be monitored (NO in step S307), the processing returns to step S303 and continues. In step S307, if the printer driver 210 identified in step S306 is determined to be a printer driver 210 to be monitored (YES in step S307), the processing proceeds to step S308. In step S308, the monitoring application 207 checks the type of the event detected in step S304.

The monitoring application 207 can identify which event has occurred, the addition, deletion, or change of the printer driver 210, by analyzing the event issued from the OS. The processing for generating and comparing the printer driver list 2 with the printer driver list 1 (steps S305 and S306) may be performed after step S308. As a result of the checking in step S308, if the event type is an event representing the addition of a printer driver 210 (ADDITION OF PRINTER DRIVER in step S308), the monitoring application 207 determines that a new printer driver 210 is installed, and the processing proceeds to step S309. In step S309, the monitoring application 207 executes processing to be performed when an installation event of a printer driver 210 is detected (installation-time processing).

Examples of the processing of step S309 when installation processing of a printer driver 210 occurs during the monitoring processing include the processing for obtaining the capability information about the foregoing image processing apparatus 216 by the monitoring application 207. Another example is processing for obtaining information about printable sheets registered in the image processing apparatus 216. The monitoring application 207 then shares the obtained information with the printer driver 210 and the print setting application 212. The processing of the printer driver 210 during the execution of the printing is thereby determined. The obtained information is reflected on the print setting screen provided by the print setting application 212.

Figure 4:
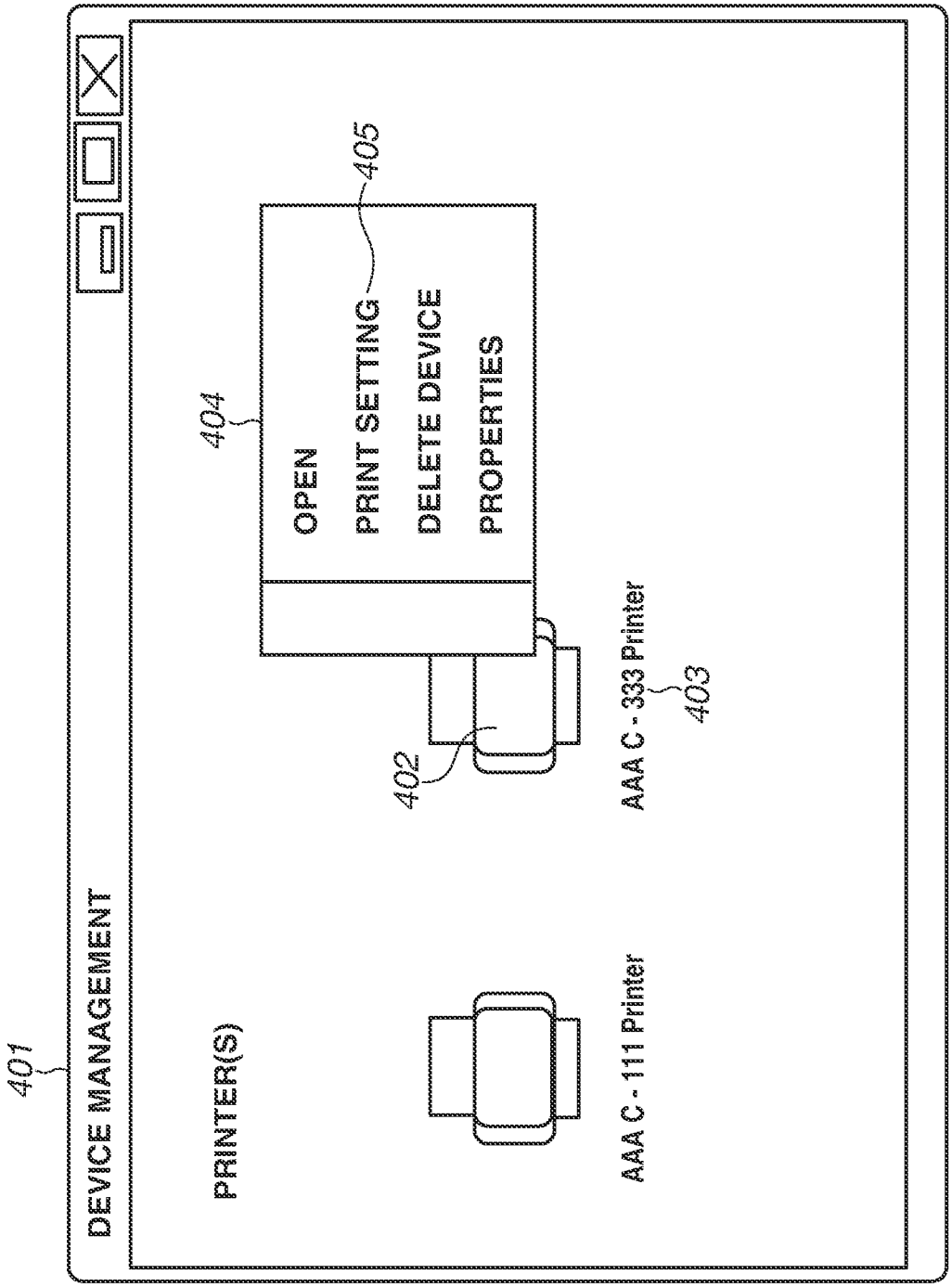
FIG. 4 is a diagram illustrating a device management screen of the OS.
Figure 5:
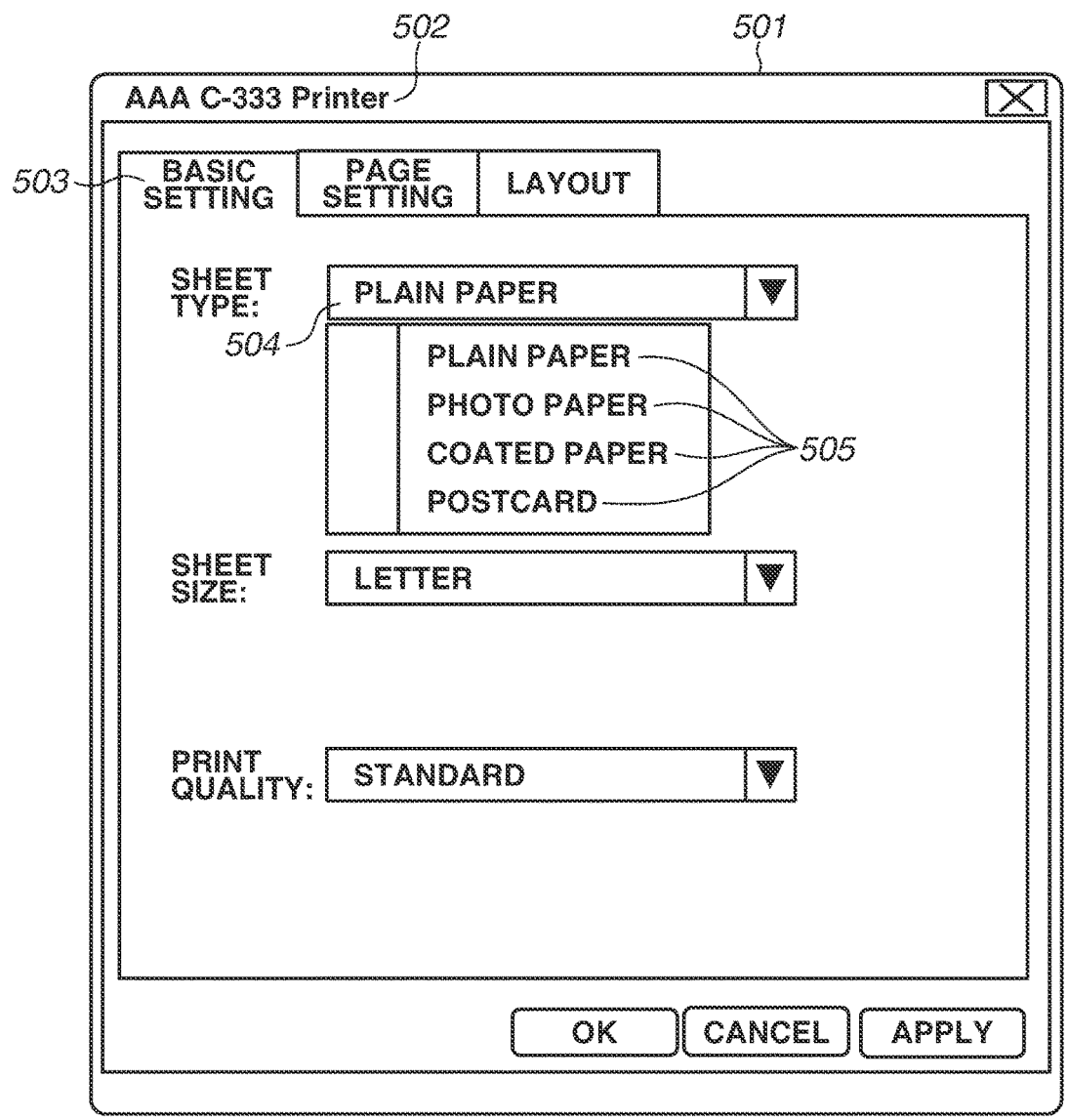
FIG. 5 is a diagram illustrating a print setting screen of a print setting application.

Referring to FIGS. 4 and 5, an example of determining the processing of the print setting application 212 based on the information about sheets printable by the image processing apparatus 216, shared from the monitoring application 207, will be described. FIG. 4 is a diagram illustrating an example of a device management screen of the OS. A device management screen 401 displays icons of printer drivers 210 installed on the OS. A printer icon 402 is accompanied by a printer icon name 403 "AAA C-333 Printer". If the user selects the printer icon 402, an operation menu 404 showing executable operations is displayed on the printer icon 402.

FIG. 5 is a diagram illustrating the print setting screen of the print setting application 212. The print setting screen is displayed if print setting 405 is selected from the operation menu 404 of the printer icon 402. A print setting screen 501 of the print setting application 212 displays a printer icon name 502. The print setting screen 501 is configured to include a plurality of sheets, among which a basic setting sheet 503 is illustrated to be selected here. The basic setting sheet 503 is capable of setting a sheet type, a sheet size, and print quality. The basic setting sheet 503 displays a currently-selected sheet type 504, and options 505 can be selected as a sheet type. The options 505 displayed here are determined based on the information obtained from the image processing apparatus 216 by the monitoring application 207. Return to the description of FIG. 3. In step S308, if the event type is an event representing the deletion of a printer driver 210 (DELETION OF PRINTER DRIVER in step S308), the monitoring application 207 determines that the printer driver 210 is uninstalled, and the processing proceeds to step S310. In step S310, the monitoring application 207 executes processing to be performed when an uninstallation event of a printer driver 210 is detected (uninstallation-time processing). Examples of the processing when uninstallation processing of a printer driver 210 occurs during the monitoring processing include processing for deleting the printer driver association file 213 of the printer driver 210 uninstalled by the monitoring application 207.

In step S308, if the event type is an event representing the change of a printer driver 210 (CHANGE OF PRINTER DRIVER in step S308), the monitoring application 207 determines that the printer driver 210 is changed, and the processing proceeds to step S311. In step S311, the monitoring application 207 executes processing to be performed when the change of a printer driver 210 is detected (change-time processing). Examples of the processing when change processing of a printer driver 210 occurs during the monitoring processing include processing for changing or editing the generation location of the foregoing printer driver association file 213 by the monitoring application 207.

All the processing of steps S309 to S311 may be performed by another piece of software called by the monitoring application 207. Steps S303 and S305 to S307 may be skipped if the processing of steps S309 to S311 can be performed without identifying the printer driver 210 or if the target printer driver 210 of the event can be identified when the event is detected.

The processing of steps S303 to S311 in FIG. 3 is repeated while the monitoring application 207 is running. The monitoring application 207 may execute the processing corresponding to all or at least one of the addition (installation), deletion (uninstallation), and change of the printer driver 210 to be monitored.

As has been described above, in the present exemplary embodiment, the provision of the monitoring application 207 for monitoring events notified from the OS enables original processing of the vendor to be performed when the printer driver 210 is installed, uninstalled, and changed.

Figure 6:
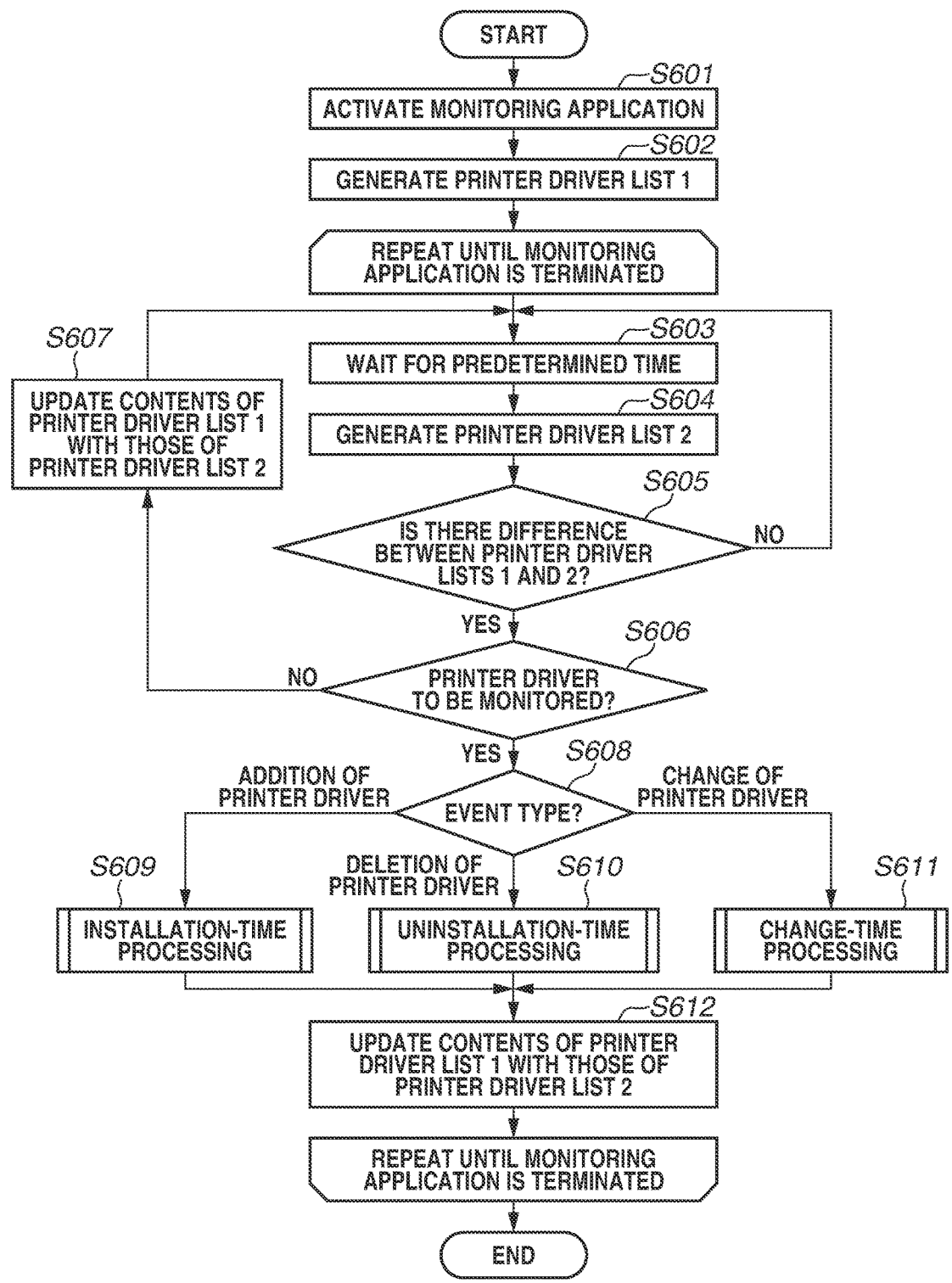
FIG. 6 is a flowchart illustrating processing not using the event notification function of the OS.

FIG. 6 is a flowchart illustrating a flow of processing of a monitoring application according to a second exemplary embodiment. A difference from the first exemplary embodiment lies in the method for detecting the addition, deletion, and change of a printer driver 210 to/from the OS. The present exemplary embodiment also uses the information processing apparatus 100 and the image processing apparatus 150 described in FIG. 1.

According to the first exemplary embodiment, in step S302 of FIG. 3, the monitoring application 207 registers the events for monitoring the addition, deletion, and change of a printer driver 210 to/from the OS by using the FindFirstPrinterChangeNotification API and the FindNextPrinterChangeNotification API provided by the OS. The present exemplary embodiment describes a method for monitoring the addition, deletion, and change of a printer driver 210 to/from the OS without using such an event mechanism provided by the OS.

In step S601, the monitoring application 207 is activated by the OS, an installer 214, or a printer driver 210. After step S601, the monitoring application 207 starts monitoring processing. The monitoring application 207 obtains information (PRINTER_INFO structure) about all printers installed on the OS by using the EnumPrinters API provided by the OS. In step S602, the monitoring application 207 generates a printer driver list 1 enumerating printer driver names and printer icon names based on the information. In step S603, the monitoring application 207 waits for a predetermined time. In step S604, the monitoring application 207 generates a printer driver list 2 by a method similar to that of step S602.

The purpose for the generation of the two printer driver lists 1 and 2 is to identify the printer driver 210 that is added, deleted, or changed before and after event detection. In step S605, the monitoring application 207 compares the printer driver list 1 generated in step S602 with the printer driver list 2 generated in step S604. From the comparison result between the two printer driver lists 1 and 2, the monitoring application 207 can determine whether a printer driver 210 is added, deleted, or changed before and after step S603. If there is no difference between the printer driver lists 1 and 2 (NO in step S605), the processing returns to step S603 and continues. If, as a result of the comparison in step S605, there is a difference between the two printer driver lists 1 and 2 (YES in step S605), the processing proceeds to step S606. In step S606, the monitoring application 207 determines whether the printer driver 210 identified as a difference is a printer driver 210 to be monitored. The determination is made by a method similar to that of step S307. If, as a result of the determination in step S606, the printer driver 210 identified as a difference in step S605 is determined not to be a printer driver 210 to be monitored (NO in step S606), the processing proceeds to step S607. In step S607, the monitoring application 207 updates the contents of the printer driver list 1. The update processing of step S607 corresponds to processing for overwriting the contents of the printer driver list 1 with those of the printer driver list 2.

The processing then returns to step S603 and continues.

In step S606, if the printer driver 210 identified as a difference in step S605 is determined to be a printer driver 210 to be monitored (YES in step S606), the processing proceeds to step S608. In step S608, the monitoring application 207 determines from the difference between the two printer driver lists 1 and 2 the type of the event occurring in the printer driver 210. For example, if the printer driver list 2 includes a printer driver 210 that is not included in the printer driver list 1, the printer driver 210 can be determined to be added before and after step S603. On the other hand, if the printer driver list 2 does not include a printer driver 210 that is included in the printer driver list 1, the printer driver 210 can be determined to be deleted before and after step S603. The information included in the printer driver lists 1 and 2 can be contrived to detect a change of a printer driver 210. For example, if printer icon names and port names are linked and stored with the printer driver names, a change of a printer icon name or port name can be detected. The processing of steps S608 to S611 is similar to that of steps S308 to S311 described in the first exemplary embodiment. Details thereof will thus be omitted. After the processing of step S609, S610, or S611, the processing proceeds to step S612. In step S612, the monitoring application 207 updates the contents of the printer driver list 1.

The processing returns to step S603 and continues. An example of the update processing of step S612 is processing for overwriting the contents of the printer driver list 1 with those of the printer driver list 2. The processing of steps S603 to S612 is repeated while the monitoring application 207 is running. If a plurality of printer drivers 210 is identified as differences in step S605, any one of the printer drivers 210 is selected and the processing of and after step S606 is performed thereon. In the update processing of the printer driver list 1 in step S607 or S612, the printer driver list 1 is updated only about the selected printer driver 210. The remaining unselected printer driver(s) 210 then can be extracted as a difference or differences after the processing returns to step S603.

As described above, according to the present exemplary embodiment, the addition, deletion, and change of a printer driver 210 to/from the OS can be monitored without the use of the event mechanism provided by the OS.

Figure 7:
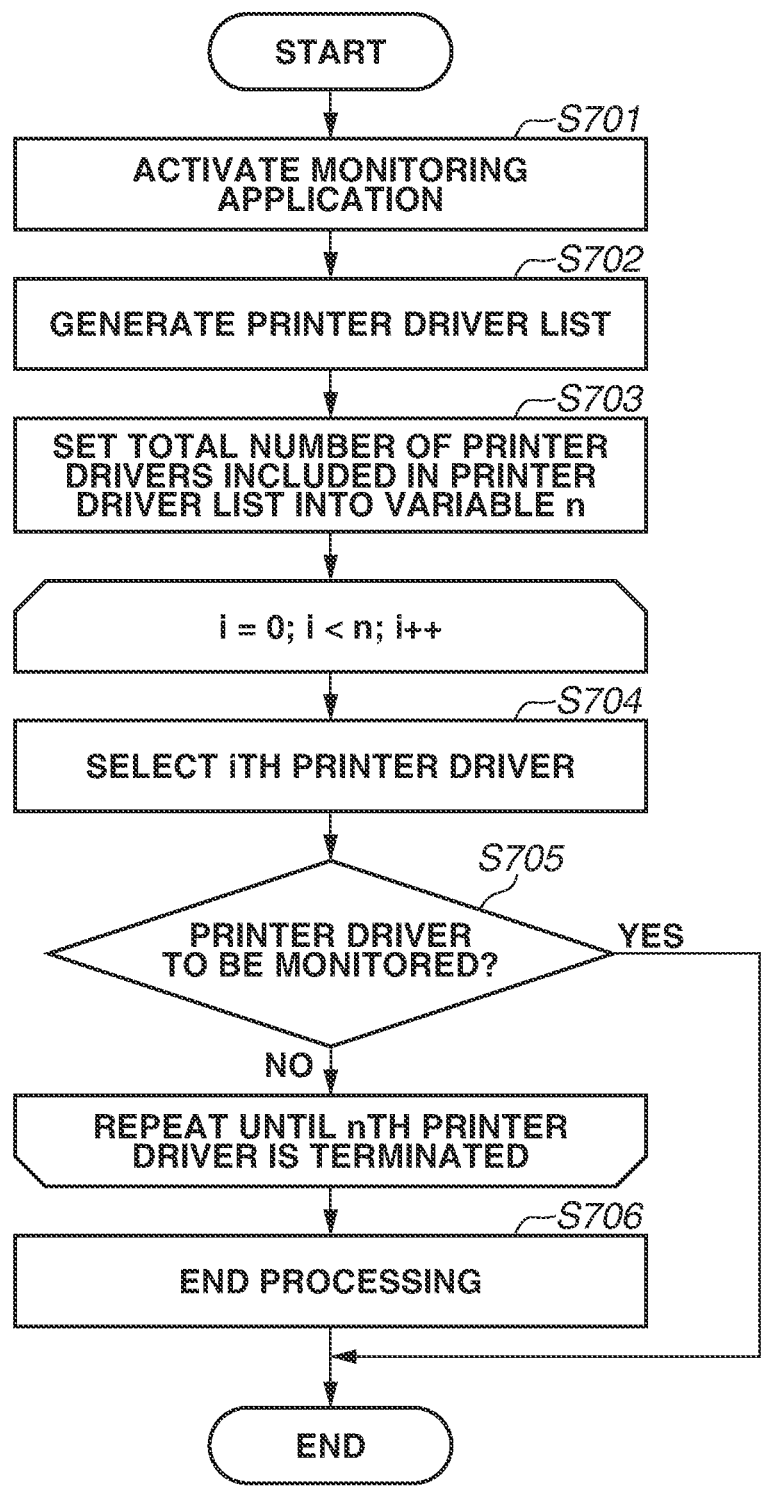
FIG. 7 is a flowchart illustrating a flow of end processing of a monitoring application.

FIG. 7 is a flowchart illustrating a flow of processing of a monitoring application according to a third exemplary embodiment. Here, end processing of a monitoring application 207 will be described. Since the monitoring application 207 is registered in the startup folder by an installer 214 or a printer driver 210, the monitoring application 207 basically starts processing immediately after the activation of the OS and ends processing when the OS is terminated. However, if the monitoring application 207 continues processing without a printer driver 210 to be monitored on the OS, the memory and CPU resource of the information processing apparatus 100 are wasted. The present exemplary embodiment describes a method for checking the OS for a printer driver 210 to be monitored, and if there is no printer driver 210 to be monitored, ending the processing of the monitoring application 207 to suppress needless resource consumption. The present exemplary embodiment also uses the information processing apparatus 100 and the image processing apparatus 150 described in FIG. 1.

In step S701, the monitoring application 207 is activated by the OS, an installer 214, or a printer driver 210. The monitoring application 207 obtains information (PRINTER_INFO structure) about printers installed on the OS by using the EnumPrinters API provided by the OS. In step S702, the monitoring application 207 generates a printer driver list enumerating printer driver names based on the information. In step S703, the monitoring application 207 sets the total number of printer drivers 210 included in the printer driver list into a variable n. In step S704, the monitoring application 207 selects the first printer driver 210 included in the printer driver list. In step S705, the monitoring application 207 determines whether the printer driver 210 is a printer driver 210 to be monitored. The determination is made by a method similar to that of step S307. If, as a result of the determination in step S705, the selected printer driver 210 is determined to be a printer driver 210 to be monitored (YES in step S705), the processing continues since there is a printer driver 210 to be monitored on the OS. On the other hand, if, as a result of the determination in step S705, the selected printer driver 210 is determined not to be a printer driver 210 to be monitored (NO in step S705), the processing proceeds to step S704. In step S704, the monitoring application 207 selects another printer driver 210 included in the printer driver list. The monitoring application 207 then performs the determination of step S705 again. If the determination of step S705 is performed on all the printer drivers 210 included in the printer driver list and none of the printer drivers 210 is determined to be a printer driver 210 to be monitored, the processing proceeds to step S706. In step S706, the monitoring application 207 ends processing. The processing to be ended here may be the entire processing of the monitoring application 207 or the processing for detecting the addition, deletion, and change of a printer driver 210 described in the first or second exemplary embodiment. In the latter case, the processing described in the present exemplary embodiment is performed on a regular basis so that if a new printer driver 210 to be monitored is added to the OS, the addition can be detected to resume the processing described in the first or second exemplary embodiment. If the determination of step S705 is yes (YES in step S705), the monitoring application 207 performs the monitoring processing based on the description of the first or second exemplary embodiment after the processing of FIG. 7.

The processing of and after step S703 may be performed on the printer driver list 1 generated in step S303, the printer driver list 1 generated in step S602, or the printer driver list 2 generated in step S604. The processing of and after step S703 may be performed irrespective of the first and second exemplary embodiments.

Figure 8:
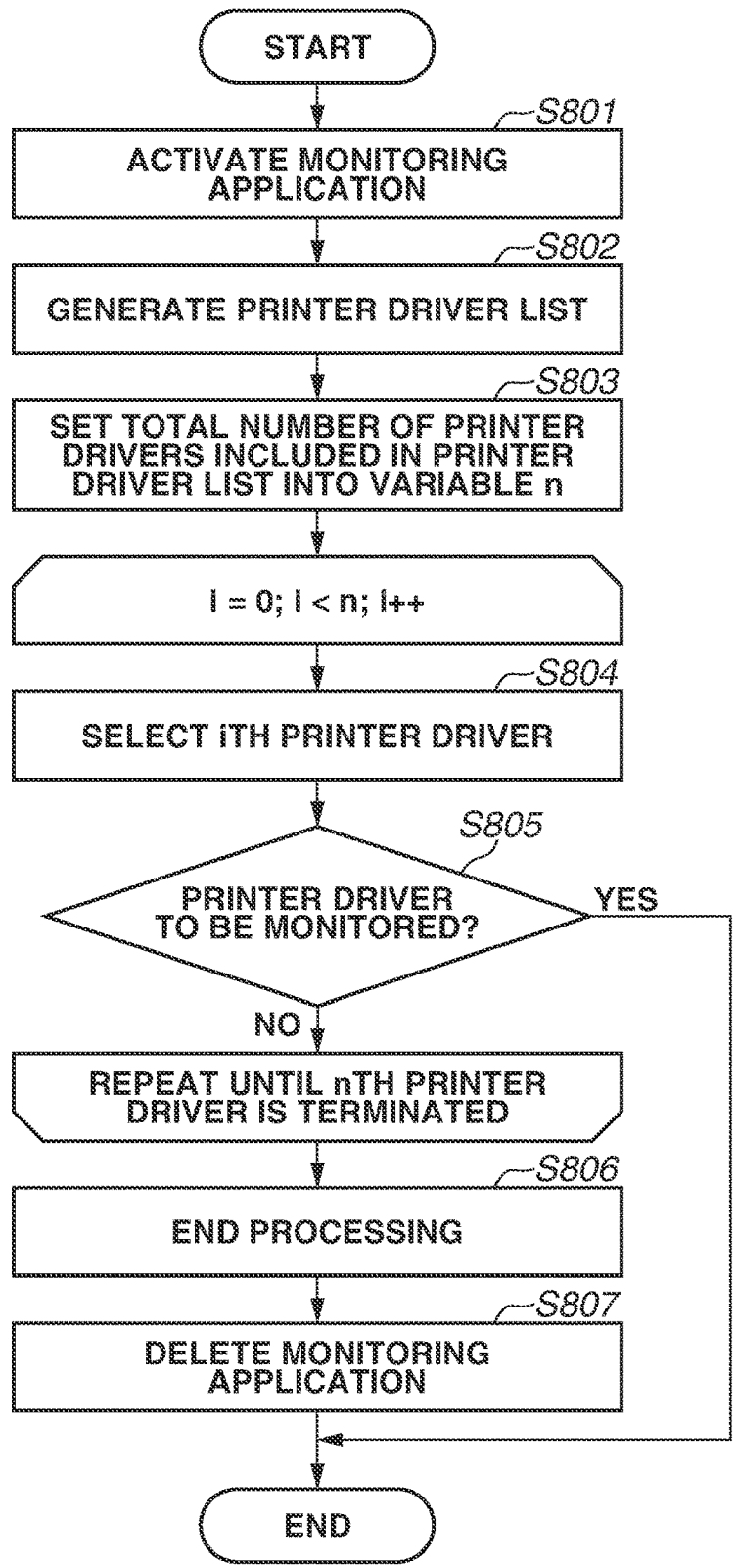
FIG. 8 is another example of the flowchart illustrating the flow of end processing of the monitoring application.

FIG. 8 is a flowchart illustrating a flow of processing of a monitoring application according to a fourth exemplary embodiment. In the third exemplary embodiment, the processing of the monitoring application 207 is described to be ended if there is no printer driver 210 to be monitored on the OS. However, even if the monitoring application 207 ends processing, the monitoring application 207 is still in the startup folder and starts processing at timing when the OS is activated again. The present exemplary embodiment describes processing in which the monitoring application 207, if the absence of a printer driver 210 to be monitored on the OS is detected, stops the processing described in the first or second exemplary embodiment and then deletes itself. The present exemplary embodiment also uses the information processing apparatus 100 and the image processing apparatus 150 described in FIG. 1.

The processing of steps S801 to S806 is similar to that of steps S701 to S706 of FIG. 7. A detailed description thereof will thus be omitted. In step S807, the monitoring application 207 deletes itself. An example of the processing of step S807 includes generating a batch file containing a command to delete the monitoring application 207, and executing the batch file by another process.

The processing of and after step S803 may be performed on the printer driver list 1 generated in step S303 of the first exemplary embodiment. The processing of and after step S803 may be performed on the printer driver list 1 generated in step S602 of the second exemplary embodiment or the printer driver list 2 generated in step S604. The processing of and after step S803 may be performed irrespective of the first and second exemplary embodiments.

FIG. 9 is a flowchart illustrating a flow of processing of a monitoring application according to a fifth exemplary embodiment. As described in the first and second exemplary embodiments, the monitoring application 207 monitors the addition of a printer driver 210 to the OS after the activation of the monitoring application 207. If there is a printer driver 210 to be monitored among printer drivers 210 already installed before the activation of the monitoring application 207, the processing when installation is detected is not able to be performed on such a printer driver 210. The present exemplary embodiment then describes a method for checking the presence or absence of a printer driver 210 installed before the activation of the monitoring application 207, and if needed, performing the processing when the installation of a printer driver 210 is detected. The present exemplary embodiment also uses the information processing apparatus 100 and the image processing apparatus 150 described in FIG. 1. In the present exemplary embodiment, the processing for sharing the information obtained from the image processing apparatus 216 with the printer driver 210, described as an example in the first exemplary embodiment, is performed as installation-time processing.

The processing of steps S901 to S905 is similar to that of steps S701 to S705. A detailed description thereof will thus be omitted. If, as a result of the determination in step S905, the selected printer driver 210 is determined to be a printer driver 210 to be monitored (YES in step S905), the processing proceeds to step S906. In step S906, the monitoring application 207 determines whether the installation-time processing on the printer driver 210 is needed. For example, if a printer driver association file 213 is generated during the installation-time processing, the monitoring application 207 can make the determination by checking the presence or the contents of the printer driver association file 213. If there is already a printer driver association file 213 or if there is a printer driver association file 213 and information to be described during the installation-time processing is already described therein, the monitoring application 207 determines that the installation-time processing is not needed (NO in step S906), and the processing proceeds to step S904. In step S904, the monitoring application 207 selects another printer driver 210 included in the printer driver list. In step S905, the monitoring application 207 makes the determination again. The monitoring application 207 may make the determination of step S905 by checking the presence or absence of registry information if the installation-time processing shares information via the Registry. The monitoring application 207 may make the determination by calling a function published by the printer driver 210 and obtaining returned information about whether the installation-time processing is completed. If the installation-time processing can be repeated without a problem, the processing may proceed to step S907 without the determination of step S906. In step S906, if the installation-time processing on the printer driver 210 selected in step S904 is determined to be needed (YES in step S906), the processing proceeds to step S907. In step S907, the monitoring application 207 performs the installation-time processing on the printer driver 210 selected in step S904. An example of the processing performed in step S907 is the same as described in the first exemplary embodiment. The processing performed in step S907 may be performed by another piece of software called by the monitoring application 207.

Steps S904 to S907 are performed on all the printer drivers 210 included in the printer driver list generated in step S902, whereby the processing to be performed when installation is detected is performed on a printer driver or drivers 210 installed before the activation of the monitoring application 207.

FIG. 10 is a flowchart illustrating a flow of processing of a monitoring application according to a sixth exemplary embodiment. As described in the first and second exemplary embodiments, the monitoring application 207 monitors the deletion of a printer driver 210 from the OS after the activation of the monitoring application 207. If a printer driver 210 is already uninstalled before the activation of the monitoring application 207, the monitoring application 207 is not able to perform the processing to be performed when uninstallation is detected. The present exemplary embodiment then describes processing on a printer driver 210 uninstalled before the activation of the monitoring application 207. The present exemplary embodiment also used the information processing apparatus 100 and the image processing apparatus 150 described in FIG. 1. In the present exemplary embodiment, the processing for deleting the printer driver association file 213 described as an example in the first exemplary embodiment is performed as uninstallation-time processing.

The processing of steps S1001 to S1003 is similar to that of steps S701 to S703. A detailed description thereof will thus be omitted. In step S1004, the monitoring application 207 generates a list (hereinafter, file list) of printer driver association files 213 located in the storage area to which the OS refers. In step S1005, the monitoring application 207 sets the total number of printer driver association files 213 included in the file list into a variable n. In step S1006, the monitoring application 207 selects the first printer driver association file 213 included in the file list. In step S1007, the monitoring application 207 selects the first printer driver 210 included in the printer driver list. In step S1008, the monitoring application 207 determines whether the printer driver association file 213 selected in step S1006 is one related to the printer driver 210 selected in step S1007. If the printer driver association file 213 selected in step S1006 is determined to be one related to the printer driver 210 selected in step S1007 (YES in step S1008), the processing proceeds to step S1006. In step S1006, the monitoring application 207 selects another printer driver association file 213 included in the file list. The monitoring application 207 then performs the processing of step S1007 again. In step S1008, if the printer driver association file 213 selected in step S1006 is determined not to be one related to the printer driver 210 selected in step S1007 (NO in step S1008), the processing proceeds to step S1007. In step S1007, the monitoring application 207 selects another printer driver 210 included in the printer driver list. The monitoring application 207 then performs the determination of step S1008 again. If the printer driver association file 213 selected in step S1006 is not related to any of the printer drivers 210 included in the printer driver list generated in step S1002, the processing proceeds to step S1009. In step S1009, the monitoring application 207 deletes the printer driver association file 213 as the uninstallation-time processing. The processing performed in step S1009 may be performed by another piece of software called by the monitoring application 207. Steps S1007 to S1009 are performed on all the printer driver association files 213 in the file list generated in step S1004, whereby the processing to be performed when uninstallation is detected is performed on a printer driver or drivers 210 uninstalled before the activation of the monitoring application 207.

The foregoing exemplary embodiments have been described by using an example in which Windows is used as the OS. However, the processing of any of the exemplary embodiments may be performed when other OSes are used.

Embodiments of the present invention may be implemented by executing the following processing. The processing includes supplying software (program) for implementing the functions of the foregoing exemplary embodiments to a system or an apparatus via a network or various storage media, and reading and executing the program by a computer (or CPU or microprocessing unit (MPU)) of the system or apparatus. The program may be executed by one computer or by a plurality of computers in a linked manner. All the processing described above does not need to be implemented by software, and part or all of the processing may be implemented by hardware such as an application specific integrated circuit (ASIC). The CPU does not need to singly perform all the processing. A plurality of CPUs may perform the processing in cooperation as appropriate.

According to embodiments of the present invention, the user's convenience can be improved even in an environment without a mechanism by which an OS calls a module of a printer driver at timing when the printer driver is installed or uninstalled.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-226553, filed Nov. 22, 2016, which is hereby incorporated by reference herein in its entirety.

What is claimed is:

1. An information processing apparatus capable of running monitoring software configured to perform monitoring processing for monitoring a printer driver, the information processing apparatus comprising:
   a first acquisition unit configured to obtain a first list showing a printer driver or drivers managed by operating system running on the information processing apparatus;
   a second acquisition unit configured to obtain a second list showing a printer driver or drivers managed by the operating system after a lapse of a predetermined time since the first list is obtained;
   a determination unit configured to determine whether installation processing or uninstallation processing of the printer driver to be monitored occurs, based on the first and second lists; and
   an execution unit configured to execute at least either one of first processing and second processing by using the monitoring software, the first processing including, if it is determined that the installation processing of the printer driver occurs, obtaining information about an image processing apparatus corresponding to the installed printer driver from the image processing apparatus, the second processing including, if it is determined that the uninstallation processing of the printer driver occurs, deleting a file related to the uninstalled printer driver, wherein the first acquisition unit, the second acquisition unit, the determination unit and the execution unit are implemented by at least one processor.

2. The information processing apparatus according to claim 1, wherein if the first processing is executed, the information about the image processing apparatus obtained by the first processing is reflected on a setting screen corresponding to the printer driver to be monitored.

3. The information processing apparatus according to claim 1, wherein an operating system running on the information processing apparatus is configured to restrict inclusion of a language monitor program for transmitting and receiving data to/from the image processing apparatus as a file constituting the printer driver.

4. The information processing apparatus according to claim 1, wherein the monitoring software is configured to delete the file which is not deleted by uninstallation of the printer driver.

5. The information processing apparatus according to claim 1, wherein the monitoring software is resident software activated in response to activation of an operating system of the information processing apparatus.

6. The information processing apparatus according to claim 1, wherein if it is determined that the installation processing of the printer driver occurs, obtaining information a printable sheet registered in the image processing apparatus as information about an image processing apparatus corresponding to the installed printer driver from the image processing apparatus.

7. A control method performed by an information processing apparatus capable of running monitoring software configured to perform monitoring processing for monitoring a printer driver, the control method comprising:

obtaining a first list showing a printer driver or drivers managed by an operating system running on the information processing apparatus;

obtaining a second list showing a printer driver or drivers managed by the operating system after a lapse of a predetermined time since the first list is obtained;

determining whether installation processing or uninstallation processing of the printer driver to be monitored occurs, based on the first and second lists;

executing at least either one of first processing and second processing by using the monitoring software, the first processing including, if it is determined that the installation processing of the printer driver occurs, obtaining information about an image processing apparatus corresponding to the installed printer driver from the image processing apparatus, the second processing including, if it is determined that the uninstallation processing of the printer driver occurs, deleting a file related to the uninstalled printer driver.

8. The control method according to claim 7, wherein if the first processing is executed, the information about the image processing apparatus obtained by the first processing is reflected on a setting screen corresponding to the printer driver to be monitored.

9. The control method according to claim 7, wherein an operating system running on the information processing apparatus is configured to restrict inclusion of a language monitor program for transmitting and receiving data to/from the image processing apparatus as a file constituting the printer driver.

10. The control method according to claim 7, wherein the monitoring software is configured to delete the file which is not deleted by uninstallation of the printer driver.

11. The control method according to claim 7, wherein the monitoring software is resident software activated in response to activation of an operating system of the information processing apparatus.

12. The control method according to claim 7, wherein if it is determined that the installation processing of the printer driver occurs, obtaining information a printable sheet registered in the image processing apparatus as information about an image processing apparatus corresponding to the installed printer driver from the image processing apparatus.

13. A non-transitory storage medium storing a program for causing an information processing apparatus to perform a control method, the information processing apparatus being capable of running monitoring software configured to perform monitoring processing for monitoring a printer driver, the control method comprising:

obtaining a first list showing a printer driver or drivers managed by an operating system running on the information processing apparatus;

obtaining a second list showing a printer driver or drivers managed by the operating system after a lapse of a predetermined time since the first list is obtained;

determining whether installation processing or uninstallation processing of the printer driver to be monitored occurs, based on the first and second lists;

executing at least either one of first processing and second processing by using the monitoring software, the first processing including, if it is determined that the installation processing of the printer driver occurs, obtaining information about an image processing apparatus corresponding to the installed printer driver from the image processing apparatus, the second processing including, if it is determined that the uninstallation processing of the printer driver occurs, deleting a file related to the uninstalled printer driver.

14. The non-transitory storage medium according to claim 13, wherein if the first processing is executed, the information about the image processing apparatus obtained by the first processing is reflected on a setting screen corresponding to the printer driver to be monitored.

15. The non-transitory storage medium according to claim 13, wherein an operating system running on the information processing apparatus is configured to restrict inclusion of a language monitor program for transmitting and receiving data to/from the image processing apparatus as a file constituting the printer driver.

16. The non-transitory storage medium according to claim 13, wherein the monitoring software is configured to delete the file which is not deleted by uninstallation of the print driver.

17. The non-transitory storage medium according to claim 13, wherein the monitoring software is resident software activated in response to activation of an operating system of the information processing apparatus.

18. The non-transitory storage medium according to claim 13, wherein if it is determined that the installation processing of the printer driver occurs, obtaining information a printable sheet registered in the image processing apparatus as information about an image processing apparatus corresponding to the installed printer driver from the image processing apparatus.

\* \* \* \* \*